March 6, 1956     C. TIFFANY     2,737,554
DETECTOR FOR TEMPERATURE CHANGE RATE
Filed June 13, 1952
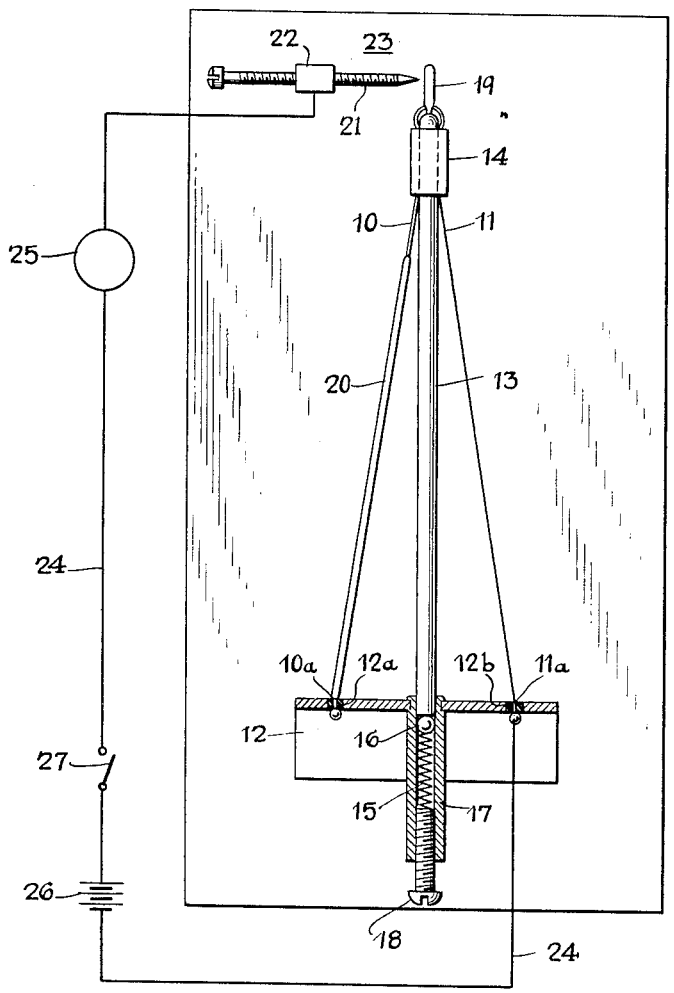
INVENTOR.
CARTER TIFFANY
BY
Ward, Crosby & Neal
ATTORNEYS.

United States Patent Office 2,737,554
Patented Mar. 6, 1956

2,737,554

DETECTOR FOR TEMPERATURE CHANGE RATE

Carter Tiffany, Englewood, N. J.

Application June 13, 1952, Serial No. 293,253

8 Claims. (Cl. 200—137)

This invention relates to an apparatus for detecting the occurrence of a preselected rate of change of ambient temperature due, for example, to fire.

Apparatus of this general type heretofore suggested have not been of such a character that they can be mass produced at low cost and, furthermore, have been encumbered with complicated measuring apparatus usually of an extremely delicate nature which can become easily maladjusted and inaccurate as caused, for example, by shock or vibration.

Also such prior apparatus have been disadvantageously affected by changes in ambient temperature due, for example, to weather change and, furthermore, such prior apparatus have not been capable of maintaining a high degree of accuracy over long periods regardless of the frequency of the actuations thereof.

One of the objects of the present invention is to overcome the above difficulties or to reduce same to insignificance.

The invention in one aspect thereof comprises a device particularly sensitive to the occurrence of fire by virtue of its sensitivity to the rate of increase of the ambient temperature exceeding a preselected value. The device has in combination a pair of wire elements which are axially expansible under the influence of heat and which normally have equal expansion characteristics in response to a common temperature change at a normal change rate. The means for mounting such wire elements is referred to as a V-tension mounting and comprises: a signal arm positioned between such wire elements, there being pivotal support means for one extremity of the signal arm located preferably between the wire elements. The inner extremities of said wire elements are spaced apart and secured to a base member. The outer extremities of the wire elements are secured to the signal arm near the outer extremity thereof (as opposed to the pivotally supported extremity) thereby forming two adjacent acute right angle triangles having a common side portion along the axis of said signal arm and also having adjacent acute angle apices. Means are provided for urging the signal arm resiliently and axially thereof in a direction normally to place said wire elements under equal tension when normal temperatures and temperature change rates prevail. Such resilient means at or near the base of the signal arm are referred to as "base resilient means." The two wire elements are of equal expansion characteristics being of the same material, such as Nichrome steel. One of the wire elements, over a substantial portion of the length thereof, is shielded by suitable heat insulating means, for example, a glass tube, which may be covered with tin foil. Thus the two wire elements will expand or contract equally in response to normal changes in ambient temperature at a normal change rate. Consequently there will be no axial expansion differential between the two wire elements under these circumstances and the signal arm will remain in its preselected "zero" or center position. However, if the rate of increase of ambient temperature exceeds a preselected amount, the shielded wire element will expand at a lower rate than the unshielded one thereby permitting the latter to become elongated relative to the former. That is, an axial expansion differential therebetween will occur which will result in an angular shifting of the signal arm. Suitable signal means are provided which are actuatable in response to such an angular shifting of the signal arm for giving an alarm.

Various, further and more specific objects, features and advantages of the invention will clearly appear from the detailed description given below taken in connection with the accompanying drawing which forms a part of the specification and illustrates, by way of example, a preferred arrangement of apparatus for carrying out the invention. The latter consists of such novel combinations of features as may be shown and described in connection with the devices herein disclosed.

In the drawing, the figure is a schematic representation of an apparatus embodying one form of the invention.

Referring to the drawing in further detail, an embodiment of the invention will be described which is designed, as aforementioned, for the detection of fire and comprises the following: A pair of wires 10 and 11 are mounted in the aforementioned V-tension mounting wherein inner extremities 10a and 11a thereof respectively are secured to a base member 12 and are electrically insulated from such base member, for example, by means of insulation at 12a and 12b, respectively. The outer extremities of the wires 10 and 11 are secured to the outer extremity of a signal arm 13 by means of a collar 14. The inner extremity of the signal arm 13 is resiliently urged axially in a vertical direction, as viewed in the figure, by means of a spring 15 which acts upon a ball 16, the latter engaging directly the base of the signal arm 13. The spring 15 and ball 16 are contained within a threaded sleeve member 17, the extent of compression of the spring 15 being controlled by an adjustment screw member 18.

The outermost extremities of the wires 10 and 11 are preferably electrically connected. In the form shown, both are attached to a signal arm tip member 19 of suitable electrically conducting material.

In order to produce a difference in axial expansion between the wires 10 and 11, in response to a predetermined rate of rise of temperature, one of the wires, as at 10, is shielded by any suitable heat insulating means, for example, by a glass tube, as at 20, which preferably is coated with a foil, such as tin foil. The tube may be open or sealed at either extremity. In lieu of such heat insulating means, the wire may be coated with an asbestos or chromium paint, ceramic material, a fibre or plastic coating. However, I have found that the above-described glass tube has accomplished satisfactory results.

One form of means for operatively associating said wire elements 10, 11 and their V-tension mounting means with a signal device comprises the following: The signal arm is associated with an electric switch means, which is actuated in response to angular movement of such arm, such switch means controlling a suitable signal device. For example: Tip member 19 is positioned adjacent the extremity of a contact 21 in the form of a threaded screw which engages a threaded support 22. The gap between the tip 19 and the contact 21 thus is easily adjusted.

Tip member 19, contact 21 and support 22 together form a switch generally indicated at 23. Switch 23 is connected by a lead 24 to the inner extremity 11a of the wire element 11. Interposed in the lead 24 is a signal means 25, such as a bell. Alternatively a relay can be used to actuate any fire fighting means or safety device such as: a sprinkler system or other fire fighting means, or the shut off mechanism for valves such as fuel valves. A suitable source of electric energy, such as a battery 26 and a switch 27, are also interposed in the lead 24.

In operation, the contact 21 and the tip member 19 are normally separated from one another and, assuming the switch 27 to be closed, the electrical circuit above set forth is open. Said circuit will remain open during normal rate of increase of temperature as, for example, due to change in the weather. This is true because such rate of increase of temperature is relatively low and the two wires 10 and 11 are heated at substantially equal rates and consequently will expand axially or elongate substantially equally thereby maintaining the signal arm in its center or zero position and maintaining the tip member 19 out of engagement with the contact 21. However, in the event that the rate of increase of temperature should reach a point in excess of a preselected amount, the two wires 10 and 11 will not be heated at equal rates. The shielded wire (10) will be heated at a substantially lower rate and consequently will be unable to expand axially or elongate as rapidly as the other wire 11. A length differential therebetween thus will occur causing the signal arm 13 to shift angularly to the left under the influence of the spring 15 and the restraining action of the wire 10 thereby causing the tip member 19 to engage the contact 21 and to complete the electric circuit as follows: from the battery 26 through the wire 11, thence to the tip member 19, contact 21 and to the battery 26 via the portion of lead 24 interposed therebetween. Thus the signal means 25 is actuated. The current thus flows through wire 11 heating it further and insuring a positive engagement between tip 19 and contact 21. Thus the signal means 25 is constantly actuated until said tip and contact are separated.

The embodiment of the figure is sensitive to the occurrence of a preselected rate of rise of temperature. However, by insulating wire 11 instead of 10, the device becomes sensitive to a preselected rate of fall of temperature.

Also the embodiment of the figure normally employs wire elements, as 10 and 11, of metal having a positive thermal coefficient of expansion. However, it is possible to employ such wires of a metal having a negative thermal coefficient of expansion.

The embodiment described above employs a so-called "open circuit" type of wiring system wherein the wires 10 and 11 can be of nichrome steel which is of relatively high resistance and coefficient of expansion. In lieu thereof a "closed circuit" system may be employed. That is, if desired, the tip member 19 and the contact 21 may normally engage one another when the temperature rate is below the preselected or actuating rate. In such closed circuit embodiment, the wire 11 instead of 10 is shielded and both wires 10 and 11 are preferably of low electrical resistance but of high coefficient of expansion, such as in aluminum or copper. Also in such closed circuit embodiment both wires 10 and 11 may be connected to constitute part of the circuit, for example, connected in parallel. Consequently, in case of fire or the occurrence of the preselected high rate of change of temperature, the circuit will be opened thereby actuating suitable signal means which may be, for example, a relay which "touches off" the alarm system when it is deenergized as a result of such opening of the circuit.

While the invention has been described with respect to a certain preferred example which has given satisfactory results, it will be understood by those skilled in the art, after understanding the invention, that various changes and modifications may be made without departing from the spirit and scope of the invention, and it is intended therefore in the appended claims to cover all such changes and modifications.

What is claimed is:

1. In apparatus of the class described, a base member; a signal arm; a pair of wire elements, one extremity of each of the latter being secured to said arm adjacent one extremity thereof, the opposite extremities of said wire elements being spaced apart and secured to said base member; such wire elements, the axis of said signal arm, and a pair of lines extending perpendicularly from said axis to each of said wire elements forming two adjacent right triangles having a common side portion along said axis and also having adjacent acute angle apices; pivot means for the opposite extremity of said signal arm; resilient means acting upon said signal arm in the region of the aforementioned opposite extremity thereof for urging same resiliently and axially thereof in a direction normally to place said wire elements under tension in a V configuration with the signal arm therebetween, said pivot means providing for pivotal movement of said signal arm in a plane substantially in the plane formed by said wires; and an insulator member surrounding one of said wire elements, the axial expansion rate of the latter being retarded relative to the other wire element when the rate of change of ambient temperature exceeds a preselected amount, said wire elements having equal expansion characteristics in response to a common temperature change at temperature rates below said preselected rate.

2. Apparatus in accordance with claim 1, including switch means operatively associated with said signal arm for actuation in response to angular movement of the latter.

3. Apparatus responsive to the occurrence of a preselected rate of change of temperature, including in combination: a signal arm; a pair of wire elements normally having equal expansion and contraction characteristics responsive to a common temperature change, said wire elements each having a base and an outer extremity, the base extremities of each of said wire elements being spaced apart and fixedly secured, the outer extremities of said wire elements being secured to said signal arm near one extremity thereof; means for mounting the opposite extremity of said arm for pivotal movement; resilient means for exerting a thrust upon and axially of said arm in the region of such pivotal means thereby placing said wire elements under tension, and thereby forming a V-tension mounting for said wire elements with said signal arm therebetween; said wire elements, and a pair of lines each perpendicular to the axis of said signal arm and extending to the base extremities of respective of said wire elements, defining two adjacent substantially right triangles having a common side portion along the axis of said signal arm and having adjacent acute angle apices; and an insulator member surrounding one of said wire elements throughout a substantial portion of the length thereof.

4. In apparatus of the class described, a pair of heat expansible wire resistance elements having substantially equal expansion characteristics, a V-tension mounting for said wire resistance elements, such mounting including an arm, one end of which is pivotally mounted, each of said wires being secured at one extremity thereof to the other end of said arm, the opposite extremities of said wires being fixedly secured to form said V-tension mounting, resilient means operatively connected to said arm in the region of the pivotally mounted end thereof for placing said wires under tension, said arm being angularly shiftable in response to an axial expansion differential between said wire elements, an insulator member surrounding one of said wire elements substantially throughout the length thereof, a contact member positioned for electrical connection with said wire elements at such other end of said arm, means for electrically interconnecting such contact member and said opposite extremities of said wires whereby an electric circuit can be controlled in response to an angular shifting of said arm toward said insulated wire element as caused by a relatively small expansion of said insulated wire element as compared to that of the other wire element, and switch means operatively associated with such a circuit.

5. In apparatus of the class described, a signal arm, a pair of heat expansible wire elements, each secured to said arm at one extremity thereof, the opposite extremities of said wire elements being secured on opposite sides of said arm adjacent the opposite extremity of the latter and in close but spaced relationship thereto whereby said elements are held in V-formation with said arm therebetween, means operatively connected to said arm at the opposite extremity thereof for exerting a resilient thrust axially of such signal arm for maintaining said wire elements under tension, said wires normally being equally expansible in response to a given common heat load applied at a normal temperature change rate, an insulator member surrounding one of said wires, the axial expansion rate of such shielded wire element being retarded relative to the other wire element at a relatively high temperature change rate, and switch means actuatable in response to angular movement of said signal arm.

6. In apparatus of the class described, a signal arm; a pair of thermo-responsive wire elements, each secured to said arm at one extremity thereof, the opposite extremities of said wires being secured on opposite sides of said arm adjacent the opposite extremity of the latter and in close but spaced relationship thereto whereby said elements are held in V-formation with said arm therebetween; the extremity of said arm opposite to the peak of said V-formation being mounted for pivotal movement including means for exerting an axial thrust upon such arm for maintaining said wire elements under tension, said wires normally being equally expansible in response to a common application of heat thereto, means for insulating a substantial portion of one of said wire elements whereby the expansion rate of such wire is lowered relative to the other wire with respect to a relatively high rate of change of temperature; and switch means responsive to angular movement of said signal arm.

7. In apparatus of the class described, the combination comprising: a pair of wires each secured at one end to a base member, a signal arm having one extremity pivotally mounted in the region of such ends, the other extremities of said wires being secured to said signal arm at a location substantially removed from the pivotal extremity thereof, resilient means for exerting an axial thrust upon said arm in the region of the pivotally mounted extremity thereof to maintain said wires under tension thereby forming a V-tension mounting for said wires, said wires being equally expansible in response to a common application of heat thereto at a normal temperature change rate, insulating means applied to a substantial portion of one of said wires whereby, in response to a common application of heat to said wires at an abnormal temperature change rate, an axial expansion differential will occur due to the insulation of one of them, said signal arm being angularly shiftable in response to such an axial expansion differential between said wires, and switch means actuatable in response to angular motion of said arm.

8. In apparatus of the class described, the combination comprising: a pair of wires secured at one end to a base member, a signal arm having one extremity pivotally mounted between the extremities of said wires secured to said base member, said arm being mounted for angular movement about an axis substantially perpendicular to a line drawn between the extremities of said wires secured to said base member, means for urging the pivotally mounted extremity of said arm axially to maintain said wires under tension thereby forming a V-tension mounting for said wires, insulating means applied to a substantial portion of one of said wires, said wires being equally expansible in response to a common application of heat thereto at a normal temperature change rate, and being unequally expansible in response to a common application of heat thereto at an abnormal temperature change rate, such unequal expansion producing an expansion differential, said signal arm being angularly shiftable in response to such an expansion differential, and switch means actuatable in response to angular motion of said arm.

References Cited in the file of this patent

UNITED STATES PATENTS

| | | |
|---|---|---|
| 1,153,755 | Bost | Sept. 14, 1915 |
| 1,230,089 | Hamilton | June 12, 1917 |
| 1,846,752 | Picard et al. | Feb. 23, 1932 |
| 2,204,791 | Davis | June 18, 1940 |